(12) United States Patent
Pitcher

(10) Patent No.: US 6,786,676 B1
(45) Date of Patent: Sep. 7, 2004

(54) TARPAULIN DEPLOYMENT DEVICE

(76) Inventor: Terry Pitcher, RD 2, Box 1121, Norridgewock, ME (US) 04957

( * ) Notice: Subject to any disclaimer, the term of this patent is extended or adjusted under 35 U.S.C. 154(b) by 0 days.

(21) Appl. No.: 10/285,589

(22) Filed: Nov. 1, 2002

(51) Int. Cl.$^7$ .............................. B09B 5/00; B60J 11/00; B65H 65/00

(52) U.S. Cl. .................... 405/129.9; 242/390; 242/379; 411/911; 296/100.11; 296/98

(58) Field of Search .................... 405/129.9; 242/390.2, 242/390, 379; 411/DIG. 911; 296/100.11, 98

(56) References Cited

U.S. PATENT DOCUMENTS

| | | | |
|---|---|---|---|
| 3,706,388 A | * 12/1972 | Westendorf | 414/724 |
| 4,050,734 A | * 9/1977 | Richard | 296/98 |
| 4,125,952 A | * 11/1978 | Jennings | 37/405 |
| 4,483,127 A | * 11/1984 | Forkner | 53/580 |
| 4,519,338 A | * 5/1985 | Kramer et al. | 118/305 |
| 4,786,208 A | * 11/1988 | Raviv | 405/176 |
| 4,909,667 A | * 3/1990 | DeMello | 405/129.9 |
| 4,995,663 A | * 2/1991 | Weaver et al. | 296/100.11 |
| 5,304,014 A | * 4/1994 | Slutz | 405/129.9 |
| 5,373,603 A | * 12/1994 | Stegens | 15/179 |
| 5,564,885 A | * 10/1996 | Staben, Jr. | 414/724 |
| 5,645,141 A | * 7/1997 | Tseng | 187/269 |
| 5,692,793 A | * 12/1997 | Wilson et al. | 296/100.15 |
| 6,264,400 B1 | * 7/2001 | Gent | 405/129.75 |
| 6,267,535 B1 | * 7/2001 | Brauer et al. | 405/129.9 |
| 6,299,094 B1 | * 10/2001 | James, Jr. | 242/390 |
| 6,301,809 B1 | * 10/2001 | Staggs, Jr. | 37/444 |
| 2001/0045758 A1 | * 11/2001 | Vieira-Soares | 296/98 |

FOREIGN PATENT DOCUMENTS

AU   WO 9746405   * 12/1997   .............. B60J/7/10

* cited by examiner

Primary Examiner—Robert J. Sandy
Assistant Examiner—Katherine Mitchell
(74) Attorney, Agent, or Firm—Anthony D. Pellegrini

(57) ABSTRACT

An improved spindle and tarpaulin combination to be used in devices to deploy and take up a tarpaulin. The device is comprised of a reinforced spindle and a tarpaulin adapted to be attached to the spindle, such that the tarpaulin may be wound and unwound upon the spindle, with the tarpaulin adapted for use with a spindle having a length substantially less than the width of the tarpaulin.

2 Claims, 2 Drawing Sheets

TARPAULIN DEPLOYMENT DEVICE

BACKGROUND OF THE INVENTION

1. Technical Field

The invention relates generally to the field of solid waste management and is directed to a combination device useful as a component in devices used for deploying and taking up a reusable cover for the open face of a landfill. More specifically, the invention is directed to an improved tarpaulin and spindle combination designed to be light weight, easily movable by typical landfill heavy equipment, and suitable for providing alternate daily cover in an inexpensive manner.

2. Description of Prior Art

Pursuant to federal regulation, all sanitary landfills are required to have their working faces covered at the end of each day or when not being worked in order to control disease, fires, odors, blowing litter, and scavenging. The traditional daily cover used is soil, at a minimum required depth of six inches. However, the use of that amount of cover soil on a daily basis is expensive and takes up an unacceptable amount of valuable landfill air space, thereby reducing the capacity of a landfill and shortening its useful life. Given the high cost of siting, permitting, and constructing of landfills, the use of alternative daily cover instead of soil can be far more cost effective, saving time and operational costs including the cost of importing soil, equipment wear and tear, labor, and valuable airspace.

The prior art discloses various devices for deploying alternate daily cover. One such device is disclosed in U.S. Pat. No. 5,620,281 (Lammers). This device employs a superstructure to support a roll of thin film, which is unrolled over the open face of a landfill. The device is moved about by heavy equipment of the kind typically used at a landfill. However, this device suffers from the disadvantage of its reliance on the thin film material. Because of the light-weight nature of the thin film, ballast must be distributed over the surface of the thin film as it is deployed in order to hold it onto the face of the landfill, necessitating the Lammers device to employ hoppers. This feature adds significantly to the complexity and weight of the device. Moreover, the heavy equipment used to position the device is also used to provide power to the hoppers and must be modified somewhat to accommodate attachment to the device, resulting in downtime between use of the equipment with the device and for other purposes. Because of the reliance of the device on the use of light weight thin film, it cannot accommodate heavier, but far less expensive, alternative daily covers, such as reusable tarpaulins. Also, the increased weight of the device due to the need to employ hoppers makes the device impractical for use with landfills having unusually soft or wet content. These limitations of the Lammers device are overcome by the present invention.

Reusable tarpaulins are an effective, low-cost alternative daily cover, but can be difficult to deploy and take up because of their bulk and weight. The deployment process is labor intensive and dangerous if done by hand. Simply dragging a tarpaulin with a machine can be destructive to the tarpaulin. The prior art discloses devices for deploying and taking up tarpaulins, thereby permitting their safe, quick, and cost-effective use as alternative daily cover. One such device is disclosed in U.S. Pat. No. 5,304,014 (Slutz). Like the device disclosed in Lammers, the Slutz device consists of a framework for carrying a tarpaulin, to be moved by heavy equipment. It both deploys and takes up the tarpaulin using hydraulics. However, this device employs a complicated means for attaching and detaching the spindle about which is wrapped the tarpaulin, as well as means for raising and lowering an attached spindle with respect to the framework. As such, it represents a fairly complicated, expensive solution to the problem of deploying reusable, cost effective alternative daily cover.

The devices represented by the prior art fail to effectively deploy and take up cost effective alternative daily cover in a simplified, inexpensive, easy to use manner. The invention disclosed is an improvement over the prior art in that it allows for the use of inexpensive, reusable tarpaulins, it employs a simplified, inexpensive spindle and tarpaulin component to carry and deploy the alternative daily cover that can be used at small landfills with a minimum of labor, it employs weight-saving design features so that it can be used with smaller, less expensive machinery, and it is less likely to cause deploying devices to sink into and become mired in the waste materials which constitute a landfill than the heavier devices disclosed by the prior art.

It is an objective of this invention to provide a new and improved spindle and tarpaulin combination to be used with a device for deploying and taking up reusable alternative daily cover for use at landfills. Other objectives of this invention will be readily apparent from the description that follows.

SUMMARY

In one aspect, the invention is directed to a component of a device used to deploy and take up a tarpaulin, to be used primarily in the field of waste management and specifically to assist in the use of a tarpaulin as a reusable, inexpensive alternative daily cover for landfills. The device comprises a spindle and a tarpaulin, wherein the tarpaulin is contained on and secured to the spindle. The device is intended to be used with a deployment device, which typically is lifted and positioned by the use of heavy equipment typically used at landfills, such as bulldozers, compactors, and excavators. The device employs weight-reducing design features which permit it to be used with smaller positioning equipment.

This aspect of the invention may include one or more of the following features: the spindle may be hollow for reduced weight and may have both interior and exterior reinforcing components for increased strength, and the tarpaulin may include a narrow tongue which serves as a connection point to the spindle, thereby allowing use of a tarpaulin having a width greater than the length of the spindle.

Other features and advantages of the invention are described below.

DESCRIPTION OF THE INVENTION

Figure 1:
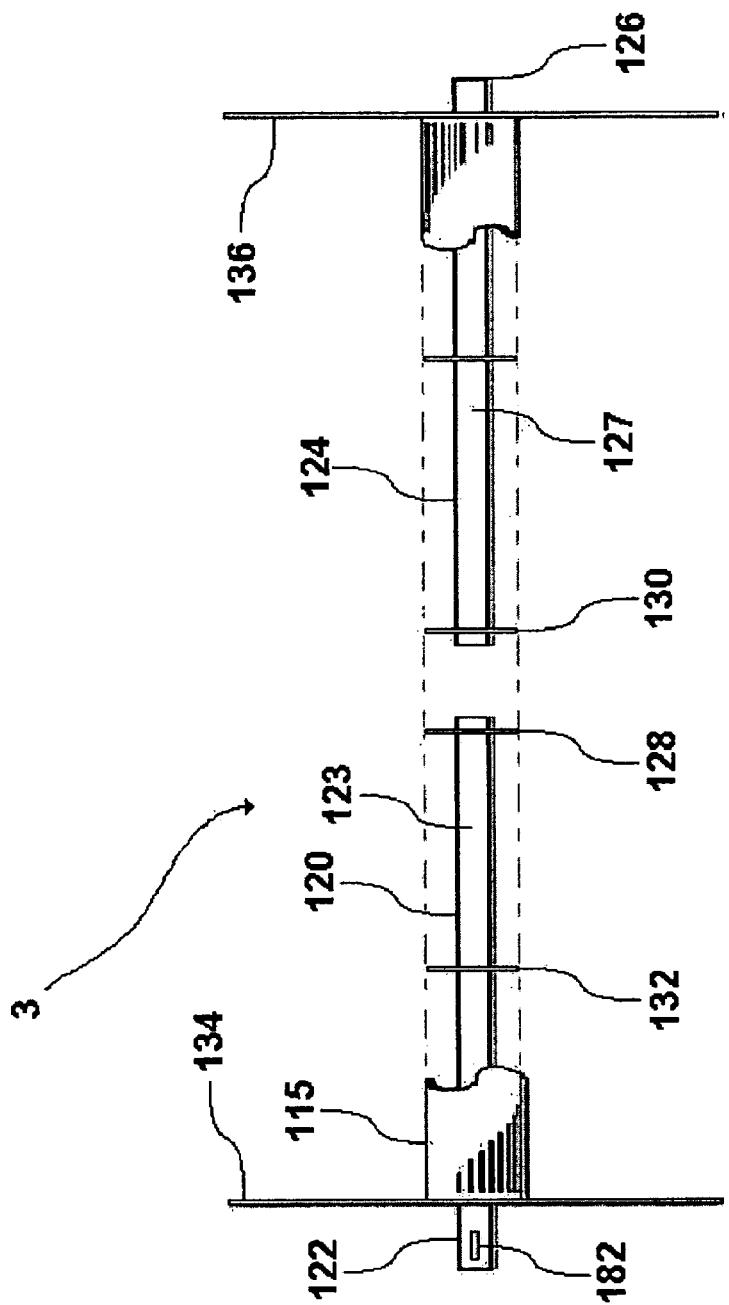
FIG. 1 is a cut-away view of the spindle; showing the outer surface of the spindle casing and the reinforcement disks and spindle axle located in the interior of the spindle.

FIG. 1 shows a cut away side view of one embodiment of the spindle 3. The spindle 3 is used to take up and deploy the tarpaulin 6. The spindle 3 is comprised of a spindle casing 115, a first spindle axle 120, and a second spindle axle 124. In one embodiment the spindle 3 also employs reinforcement disks 128,130,132. The spindle casing 115 is a cylindrical hollow metal tube having a constant inside diameter. The first spindle axle 120 is a solid metal rod having a round cross-section and a constant diameter. Its overall length is less than one half the length of the spindle casing 115. The second spindle axle 124 is a solid metal rod having a round cross-section and a constant diameter substantially equal to the diameter of the first spindle axle 120 and having a length less than one half the length of the spindle casing 115. The outside end 122 of the first spindle axle 120 or the outside end 126 of the second spindle axle 124 may include a slot 182 or other means for assisting with rotating the spindle 3. Each of the reinforcement disks 128,130,132 is substantially circular and of equal dimension with each other reinforcement disk 128,130,132, with each reinforcement disk 128,130,132 having a diameter just slightly less than the inside diameter of the spindle casing 115 and each reinforcement disk 128,130,132 having a center circular aperture with an inside diameter just slightly greater than the diameter of the first spindle axle 120.

The inside end 121 of the first spindle axle 120 is inserted into the center circular aperture 129 of the first reinforcement disk 128 and fixedly attached thereto. Two or more supplemental reinforcement disks 132 are disposed along the shaft 123 of the first spindle axle 120 and are fixedly attached to the shaft 123 of the first spindle axle 120, so that the shaft 123 of the first spindle axle 120 passes through the center circular aperture 133 of each such supplemental reinforcement disk 132. The first spindle axle 120 is placed into the interior space 119 of the spindle casing 115 so that only the outside end 122 of the first spindle axle 120 is positioned exterior to the first end 116 of the spindle casing 115 and each of the reinforcement disks 128,132 fixedly attached to the first spindle axle 120 are positioned within the interior space 119 of the spindle casing 115. The foregoing arrangement is repeated with the second spindle axle 124, the second reinforcement disk 130, and a like number of supplemental reinforcement disks 132, with the second spindle axle 124 placed into the interior space 119 of the spindle casing 115 so that only the outside end 126 of the second spindle axle 124 is positioned exterior to the second end 117 of the spindle casing 115 and each of the reinforcement disks 130,132 fixedly attached to the second spindle axle 124 are positioned within the interior space 119 of the spindle casing 115. All supplemental reinforcement disks 132 are fixedly attached to the inside surface 118A of the spindle casing 115.

One embodiment of the spindle 3 includes a first circular guide plate 134 and a second circular guide plate 136. The first circular guide plate 134 is substantially circular and has a diameter greater than the inside diameter of the spindle casing 115. It has a center circular aperture with an inside diameter just slightly greater than the diameter of the first spindle axle 120. The second circular guide plate 136 is substantially the same size and shape as the first circular guide plate. The first circular guide plate 134 is fixedly attached to the shaft 123 of the first spindle axle 120 between the first end of the spindle casing 115 and the outside end 122 of the first spindle axle 120, such that the shaft 123 of the first spindle axle 120 passes through the center circular aperture of the first circular guide plate 134. The second circular guide plate 136 is fixedly attached to the shaft 127 of the second spindle axle 124 in substantially the same manner. The circular guide plates 134,136 close off the inner space of the spindle casing 115 and serve to keep the tarpaulin 6 neatly on the spindle 3. They also keep landfill content out of the interior space of the spindle casing 115. The circular guide plates 134,136 are not designed to support the weight of the spindle 3, however.

Figure 2:
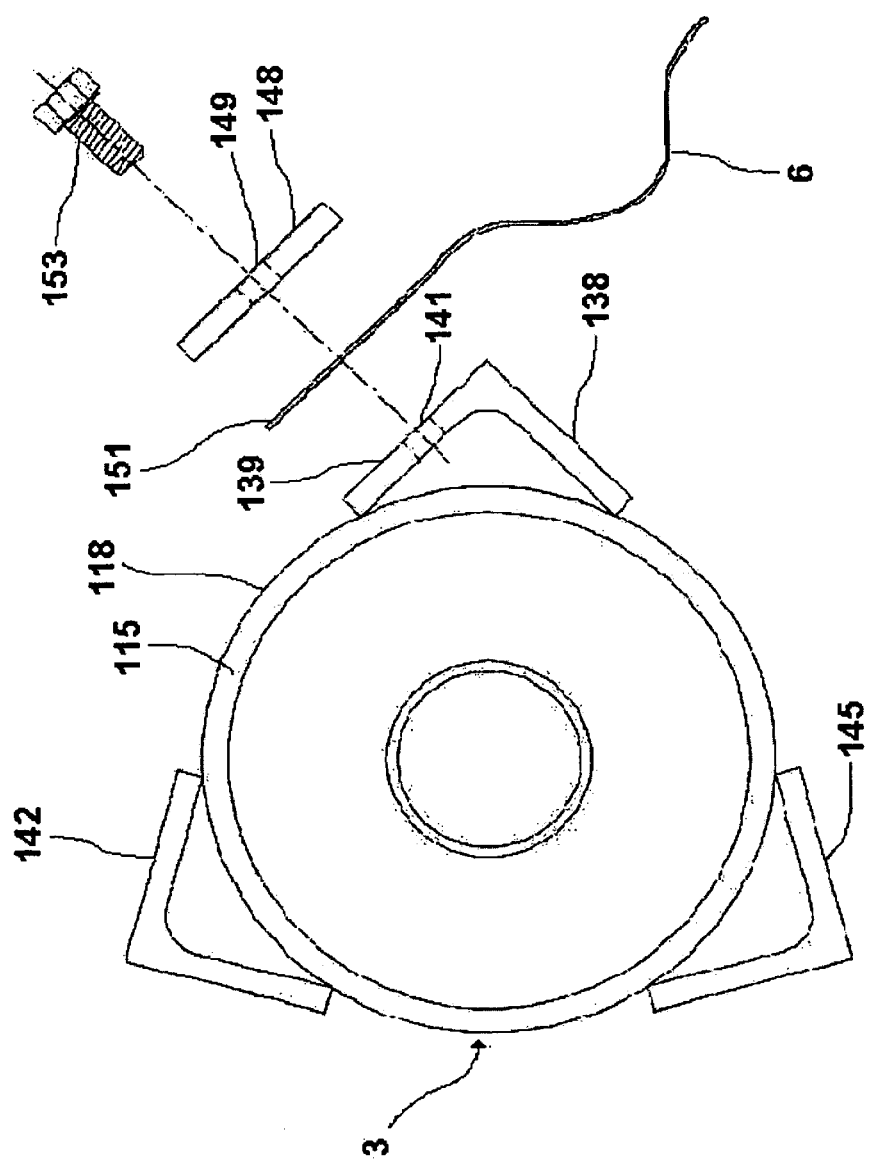
FIG. 2 is an end view of the spindle, showing the spindle support bars and a means for attaching the tarpaulin to the spindle.

Fixedly attached to the outer surface 118 of the spindle casing 115 are a first spindle support bar 138, a second spindle support bar 142, and a third spindle support bar 145, adapted to provide strength and rigidity to the spindle casing 115. These are shown in FIG. 2. Each of the spindle support bars 138,142,145 is constructed of angle iron and is of substantially equal length to each other spindle support bar 138,142,145 and to the spindle casing 115. In addition, there may be disposed on the first side 139 of the first spindle support bar 138 first perforations 141. The first spindle support bar 138 is oriented substantially along the longitudinal axis of the spindle casing 115, the second spindle support bar 142 is oriented substantially along the longitudinal axis of the spindle casing 115, and the third spindle support bar 145 is oriented substantially along the longitudinal axis of the spindle casing 115, with the first spindle support bar 138, the second spindle support bar 142, and the third spindle support bar 145 being disposed substantially evenly about the outer surface 118 of the spindle casing 115.

The use of the first and second spindle axles 120,124, the reinforcement disks 128,130,132, and the three spindle support bars 138,142,145 greatly strengthens the spindle casing 115 and allows it to hold a greater quantity of tarpaulin 6 without undue flexing or distortion, while at the same time minimizing the overall weight of the spindle 3.

In one embodiment, the tarpaulin 6 has a protrusion from one edge 150 of the tarpaulin 6 forming a tongue 151. The tongue 151 is narrower in width than the length of the spindle 3. In this embodiment the tarpaulin 6 is attached to the tarpaulin attachment component 4 at the tongue 151. The use of the tongue 151 allows the full width of the tarpaulin 6 to exceed the length of the spindle 3. In this configuration, the tarpaulin 6 is placed next to the spindle 3 and its tongue 151 is attached to the spindle 3. Before the tarpaulin 6 is taken up onto the spindle 3, the excess width of the tarpaulin 6 is folded towards the center of the tarpaulin 6, such that the width of the tarpaulin 6 as folded does not exceed the length of the spindle 3. Then the spindle 3 is rotated and the tarpaulin 6 is wound onto the spindle 3. In this way a much wider tarpaulin 6 may be used while minimizing the overall length and weight of the spindle 3, making deployment of the tarpaulin 6 more efficient. To deploy the tarpaulin 6 in this embodiment, the spindle 3 is rotated in an opposite direction to unwind the tarpaulin 6 therefrom, and then the excess width of the tarpaulin 6 is unfolded such that it lies flat on the ground.

FIG. 2 depicts one embodiment of a means for attaching the tarpaulin 6 to the spindle 3. It comprises a tarpaulin attachment plate 148 constructed of metal, having substantially the same size and shape as the first side 139 of the first spindle support bar 138 and having second perforations 149 regularly disposed along its length corresponding to the first perforations 141 disposed along the length of the first side 139 of the first spindle support bar 138. The tarpaulin attachment plate 148 is positioned alongside the first side 139 of the first spindle support bar 138 such that the second perforations 149 are aligned with the first perforations 141. The tarpaulin 6 is secured to the spindle 3 by being placed between the tarpaulin attachment plate 148 and the first side 139 of the first spindle support bar 138, and then having a plurality of fasteners 153 passed through the second perforations 149, through the tarpaulin 6, and through the first perforations 141, thereby securing the tarpaulin 6 tightly between the tarpaulin attachment plate 148 and the first side 139 of the first spindle support bar 138. In one embodiment of the claimed invention, the tongue 151 of the tarpaulin 6 is secured between the first side 139 of the first spindle support bar 138 and the tarpaulin attachment plate 148. The tarpaulin 6 is thus securely attached for normal use, but may be easily detached for repair or replacement.

Modifications and variations can be made to the disclosed embodiments of the invention without departing from the subject or spirit of the invention as defined in the following claims.

What I claim:

1. A device to be used as a component in an apparatus which deploys and takes up a tarpaulin, said device comprising a spindle and a tarpaulin, with the spindle having a spindle casing comprised of a cylindrical hollow metal tube having a constant inside diameter and having a first end, a second end, an outer surface, and an interior space;

a first spindle axle comprising a solid metal rod having a round cross-section and a constant diameter, having an inside end, an outside end, and a shaft, and having a length less than one half the length of the spindle casing, with the inside end of the first spindle axle and the shaft of the first spindle axle positioned within the interior space of the spindle casing, and with the outside end of the first spindle axle positioned exterior to the first end of the spindle casing;

a second spindle axle comprising a solid metal rod having a round cross-section and a constant diameter substantially equal to the diameter of the first spindle axle, having an inside end, an outside end, and a shaft, and having a length substantially equal to the length of the first spindle axle, with the inside end of the second spindle axle and the shaft of the second spindle axle positioned within the interior space of the spindle casing, and with the outside end of the second spindle axle positioned exterior to the second end of the spindle casing;

a first reinforcement disk, being substantially circular, having a diameter just slightly less than the inside diameter of the spindle casing, and having a center circular aperture with an inside diameter just slightly greater than the diameter of the first spindle axle, with the first reinforcement disk fixedly attached to the inside end of the first spindle axle such that the inside end of the first spindle axle passes into the center circular aperture of the first reinforcement disk;

a second reinforcement disk, having substantially the same dimensions and shape as the first reinforcement disk, and having a center circular aperture with an inside diameter just slightly greater than the diameter of the second spindle axle, with the second reinforcement disk fixedly attached to the inside end of the second spindle axle such that the inside end of the second spindle axle passes into the center circular aperture of the second reinforcement disk;

at least four supplemental reinforcement disks, with each supplemental reinforcement disk having substantially the same dimensions and shape as the first reinforcement disk, and each supplemental reinforcement disk having a center circular aperture with an inside diameter just slightly greater than the diameter of the first spindle axle, with a plurality of supplemental reinforcement disks disposed along the shaft of the first spindle axle within the interior space of the spindle casing and fixedly attached to the spindle casing and fixedly attached to the shaft of the first spindle axle such that the shaft of the first spindle axle passes through the center circular aperture of each such supplemental reinforcement disk, and with a like plurality of supplemental reinforcement disks disposed along the shaft of the second spindle axle within the interior space of the spindle casing fixedly attached to the spindle casing and fixedly attached to the shaft of the second spindle axle such that the shaft of the second spindle axle passes through the center circular aperture of each such supplemental reinforcement disk;

a first spindle support bar constructed of angle iron, having a first side and a second side, with the first side having a common edge with the second side, with the first side of the first spindle support bar fixedly attached to the outer surface of the spindle casing and the second side of the first spindle support bar fixedly attached to the outer surface of the spindle casing, and with the first spindle support bar oriented substantially along the longitudinal axis of the spindle casing;

a second spindle support bar constructed of angle iron and having a length substantially equal to the length of the first spindle support bar, having a first side and a second side with the first side having a common edge with the second side, with the first side of the second spindle support bar fixedly attached to the outer surface of the spindle casing and the second side of the second spindle support bar fixedly attached to the outer surface of the spindle casing, and with the second spindle support bar oriented substantially along the longitudinal axis of the spindle casing; and a third spindle support bar constructed of angle iron and having a length substantially equal to the length of the first spindle support bar, having a first side and a second side with the first side having a common edge with the second side, with the first side of the third spindle support bar fixedly attached to the outer surface of the spindle casing and the second side of the third spindle support bar fixedly attached to the outer surface of the spindle casing, with the third spindle support bar oriented substantially along the longitudinal axis of the spindle casing;

with the first spindle support bar, the second spindle support bar, and the third spindle support bar disposed substantially evenly about the outer surface of the spindle casing; and with the tarpaulin having a first edge and a tongue, with the tarpaulin having a width greater than the length of the spindle and with the tongue being a portion of the tarpaulin projecting beyond the first edge and having a width less than the length of the spindle, with the tongue adapted to being secured to the first spindle support bar.

2. A device to be used as a component in an apparatus which deploys and takes up a tarpaulin, said device comprising a spindle and a tarpaulin, with the spindle having a spindle casing comprised of a cylindrical hollow metal tube having a constant inside diameter and having a first end, a second end, an outer surface, and an interior space;

a first spindle axle comprising a solid metal rod having a round cross-section and a constant diameter, having an inside end, an outside end, and a shaft, and having a length less than one half the length of the spindle casing, with the inside end of the first spindle axle and the shaft of the first spindle axle positioned within the interior space of the spindle casing, and with the outside end of the first spindle axle positioned exterior to the first end of the spindle casing;

a second spindle axle comprising a solid metal rod having a round cross-section and a constant diameter substantially equal to the diameter of the first spindle axle, having an inside end, an outside end, and a shaft, and having a length substantially equal to the length of the first spindle axle, with the inside end of the second spindle axle and the shaft of the second spindle axle positioned within the interior space of the spindle casing, and with the outside end of the second spindle axle positioned exterior to the second end of the spindle casing;

a first reinforcement disk, being substantially circular, having a diameter just slightly less than the inside diameter of the spindle casing, and having a center circular aperture with an inside diameter just slightly greater than the diameter of the first spindle axle, with the first reinforcement disk fixedly attached to the inside end of the first spindle axle such that the inside end of the first spindle axle passes into the center circular aperture of the first reinforcement disk;

a second reinforcement disk, having substantially the same dimensions and shape as the first reinforcement disk, and having a center circular aperture with an inside diameter just slightly greater than the diameter of the second spindle axle, with the second reinforcement disk fixedly attached to the inside end of the second spindle axle such that the inside end of the second spindle axle passes into the center circular aperture of the second reinforcement disk;

at least four supplemental reinforcement disks, with each supplemental reinforcement disk having substantially the same dimensions and shape as the first reinforcement disk, and each supplemental reinforcement disk having a center circular aperture with an inside diameter just slightly greater than the diameter of the first spindle axle, with a plurality of supplemental reinforcement disks disposed along the shaft of the first spindle axle within the interior space of the spindle casing and fixedly attached to the spindle casing and fixedly attached to the shaft of the first spindle axle such that the shaft of the first spindle axle passes through the center circular aperture of each such supplemental reinforcement disk, and with a like plurality of supplemental reinforcement disks disposed along the shaft of the second spindle axle within the interior space of the spindle casing fixedly attached to the spindle casing and fixedly attached to the shaft of the second spindle axle such that the shaft of the second spindle axle passes through the center circular aperture of each such supplemental reinforcement disk;

a first spindle support bar constructed of angle iron, having a first side and a second side, with the first side having a common edge with the second side, with the first side of the first spindle support bar fixedly attached to the outer surface of the spindle casing and the second side of the first spindle support bar fixedly attached to the outer surface of the spindle casing, and with the first spindle support bar oriented substantially along the longitudinal axis of the spindle casing;

a second spindle support bar constructed of angle iron and having a length substantially equal to the length of the first spindle support bar, having a first side and a second side with the first side having a common edge with the second side, with the first side of the second spindle support bar fixedly attached to the outer surface of the spindle casing and the second side of the second spindle support bar fixedly attached to the outer surface of the spindle casing, and with the second spindle support bar oriented substantially along the longitudinal axis of the spindle casing; and a third spindle support bar constructed of angle iron and having a length substantially equal to the length of the first spindle support bar, having a first side and a second side with the first side having a common edge with the second side, with the first side of the third spindle support bar fixedly attached to the outer surface of the spindle casing and the second side of the third spindle support bar fixedly attached to the outer surface of the spindle casing, with the third spindle support bar oriented substantially along the longitudinal axis of the spindle casing;

with the first spindle support bar, the second spindle support bar, and the third spindle support bar disposed substantially evenly about the outer surface of the spindle casing and with the tarpaulin adapted to being secured to the spindle.

\* \* \* \* \*